United States Patent
Frank et al.

(10) Patent No.: US 7,728,466 B2
(45) Date of Patent: Jun. 1, 2010

(54) MACHINE BASED ON SUPERCONDUCTING TECHNOLOGY WITH PART SUPPORT ELEMENTS

(75) Inventors: Michael Frank, Uttenreuth (DE); Peter Massek, Forchheim (DE); Wolfgang Nick, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/992,482

(22) PCT Filed: Aug. 3, 2006

(86) PCT No.: PCT/EP2006/065004

§ 371 (c)(1),
(2), (4) Date: Mar. 24, 2008

(87) PCT Pub. No.: WO2007/033858

PCT Pub. Date: Mar. 29, 2007

(65) Prior Publication Data
US 2009/0115267 A1    May 7, 2009

(30) Foreign Application Priority Data
Sep. 23, 2005    (DE) .................. 10 2005 045 595

(51) Int. Cl.
H02K 9/00 (2006.01)
H02K 1/22 (2006.01)
(52) U.S. Cl. .................. 310/52; 310/261.1
(58) Field of Classification Search .................. 310/52, 310/54, 61, 261.1
See application file for complete search history.

(56) References Cited

U.S. PATENT DOCUMENTS

| 3,745,389 A | | 7/1973 | Lorch |
| 4,329,602 A | * | 5/1982 | Gillet .................. 310/52 |
| 4,599,592 A | * | 7/1986 | Marsing .................. 335/216 |
| 4,914,328 A | | 4/1990 | Hooper |
| 6,794,792 B2 | * | 9/2004 | Wang .................. 310/270 |
| 2006/0125331 A1 | * | 6/2006 | Frank et al. .................. 310/52 |

FOREIGN PATENT DOCUMENTS

| EP | 0 087 263 A2 | 2/1983 |
| EP | 1258973 A2 | 11/2002 |
| JP | 56086050 A | 7/1981 |
| JP | 7222431 A | 8/1995 |
| WO | WO 0243224 A1 | 5/2002 |
| WO | WO 03009454 A2 | 1/2003 |
| WO | 2004/057741 A1 | 7/2004 |
| WO | WO2004057741 | * 7/2004 | .................. 310/52 |

* cited by examiner

*Primary Examiner*—Quyen Leung
*Assistant Examiner*—Leda Pham
(74) *Attorney, Agent, or Firm*—Staas & Halsey LLP

(57) ABSTRACT

The machine contains a rotor with a hot rotor housing in which a cold part with a superconductive rotor winding is located. A part which acts as a baffle screen is provided on the outside of the rotor housing, facing a stator. Supporting elements are intended to be provided at predetermined points between the hot housing and the cold part, extending in the radial direction to such an extent that, during normal operation of the machine, a short separation is in each case formed between the supporting elements and the hot housing or the cold part, and such that a force fit is produced between the hot housing and the cold part via the supporting elements only in the event of a defect which leads to deformation of the hot housing of the machine.

18 Claims, 1 Drawing Sheet

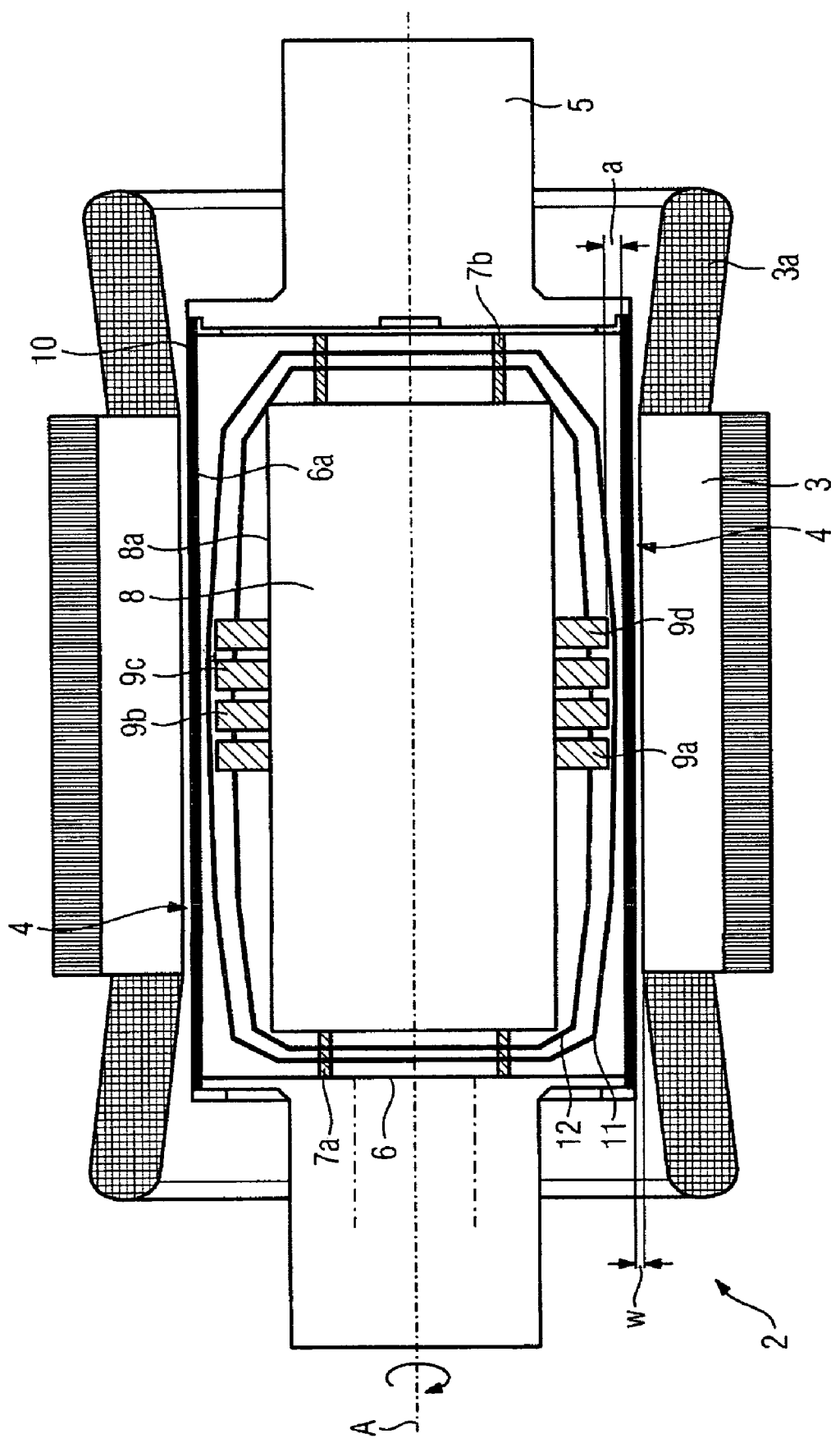

MACHINE BASED ON SUPERCONDUCTING TECHNOLOGY WITH PART SUPPORT ELEMENTS

CROSS REFERENCE TO RELATED APPLICATIONS

This application is based on and hereby claims priority to International Application No. PCT/EP2006/065004, filed on Aug. 3, 2006, and German Application No. 10 2005 045 595.6 filed on Sep. 23, 2005, the contents of which are hereby incorporated by reference.

BACKGROUND

A superconducting technology machine has a stator, which encloses a rotor mounted so as to rotate about a rotor axis while forming an air gap, wherein the rotor contains a cold part, in which superconductors of a rotor winding, which are to be cooled, are arranged and a which is enclosed by a warm housing on whose outer wall, facing the air gap, there is at least one part acting as a dampener shield, and has thermal insulation between the cold part and the warm housing.

A corresponding machine is disclosed by U.S. Pat. No. 4,914,328 A.

So-called sudden short-circuit represents a serious anomalous situation of rotating electrical machines. In the event of such a sudden short-circuit, overload torques can occur which amount to a multiple of the net torque of the machine, for example from 10 to 20 times in the case of a two-pole rotor winding. Despite all precautionary measures, during the operation of a machine it is not possible to rule out such short-circuits which, for example, may be due to misconnections or incorrect servicing. As a corresponding precautionary measure, a type test of a machine furthermore often requires demonstration that such anomalous situations will not cause long-term damage to parts of the machine.

Besides other undesired effects in such anomalous situations of a machine with a superconducting rotor winding, considerable loads also occur in the radial outer wall of a warm housing of the rotor, which is formed as a vacuum housing or cryostat housing for thermal insulation reasons. This is because the housing or cryostat outer wall which faces the stator winding, and which generally is formed of a metallic material, simultaneously acts as an electromagnetic dampener shield or carries such a shield (cf. U.S. Pat. No. 4,914,328 A cited in the introduction). Heavy currents can moreover be induced here, especially when the dampener shield is formed of a material with good electrical conductivity. In interaction with the magnetic B field generated between the rotor and the stator, these currents then entail high Lorentz forces.

As mentioned, such loads have twofold effects on a dampener shield. On the one hand, the dampener shield is deformed by the forces occurring. There are regions where it is exposed to a compression force from the outside and bends inward, while in other regions it experiences a corresponding deformation outward. The dampener shield must not touch the stator, since the latter could then be destroyed. Assistance can be achieved here by an air gap correspondingly dimensioned amply between the stator inner radius and the housing outer radius. The effect of this, particularly in the case of axially extended rotors, is that values are required for the radial extent of the air gap which are significantly more than a few millimeters, as is usual in conventional machines. On the other hand, in such an anomalous situation material stresses also occur in the dampener shield owing to the deformation. The corresponding loads must be less than the limit value for plastic deformation of the selected dampener shield material, since otherwise the outer housing of the rotor would remain deformed after a short-circuit. Assistance can be provided here only by a sufficient wall thickness of the dampener shield.

Both precautionary measures, however, mean that the "magnetic air gap" (the electromagnetic interaction between the rotor winding and the stator winding of the machine) must therefore correspondingly be dimensioned sizably. Since on the other hand the fields decrease with a decreasing distance from the field-generating cold part of the rotor, or its superconducting rotor winding, larger wall thicknesses and large air gaps entail significantly inferior utilization of the superconductor material being employed.

SUMMARY

In a machine having the features mentioned in the introduction, it is therefore one possible object to avoid such over-dimensioning which is attributable, in particular, to deformation of the dampener shield or of correspondingly acting housing parts in an anomalous situation.

The inventors propose a machine having the features mentioned in the introduction, in which support elements are provided at predetermined positions between the warm housing and the cold part, and they extend so far in the radial direction that a small distance is respectively formed between the support elements and the warm housing or the cold part in an undisturbed operating situation of the machine, and there is a force-fit between the warm housing and the cold part by the support elements only in an anomalous situation of the machine that leads to a deformation of the warm housing (or of the dampener part connected to it) which exceeds a predetermined extent.

Specifically, the proposed machine is based on the idea that support elements on the warm housing or the cold part, at the positions where the dampener shield (or the housing part acting as such) experiences compressive forces, make it possible on the one hand to work with a comparatively small wall thickness of the housing and/or dampener shield and with small mechanical air gaps, and moreover on the other hand to control sudden short-circuit loads sufficiently reliably. The support elements are dimensioned so that in normal operation, they have no mechanical contact with the warm housing or cryostat wall or the dampener shield on the one hand, or with the cold part on the other hand, in order to avoid losses due to conductive heat input. Depending on the geometry and the material data of the dampener shield, a certain extent of deformation is in this case permissible without detrimental effects. This means that the support elements are then dimensioned so that they only become effective beyond a predetermined deformation of the dampener shield. They therefore actually have to absorb only those force components which would be needed in order to deform the dampener shield by more than this predetermined permissible extent.

The advantages associated with the proposed configuration of the machine are consequently that the magnetic air gap can be kept comparatively small, and that the superconductors employed can therefore be utilized with a correspondingly high efficiency. Furthermore, owing to the specially proposed embodiment of support elements, the thermal load during normal operation of the machine is not increased, or is increased only slightly.

Accordingly the proposed machine, designed in particular as a synchronous motor, preferably as a generator, may additionally have the following features:

The support elements may preferably be arranged at those positions where a deformation force acting radially inward engages on the warm housing in the anomalousituation.

These positions generally lie in a central region of the rotor, as seen axially, where the greatest deformation is to be feared. This is because the housing generally has a sufficiently large radial stiffness in the end-side regions. The number of support elements, and therefore their total thermally conductive cross section, can thereby be limited.

The dampener shield may either be formed as part of the warm housing or arranged on the outside or inside of the warm housing. Both the configuration options are widely known.

It is preferable to provide a plurality of support elements, which are distributed in the axial direction and have comparatively small individual cross sections. Thermal transmission between the cold part and the warm housing can also be limited in this way.

The support elements may preferably be formed of poorly thermally conducting material, such as in particular a glass fiber-reinforced material, in order to keep the heat transfer as low as possible while having a sufficient stiffness.

In particular a vacuum or at least one superinsulation may be envisaged as thermal insulation. Corresponding measures are widely known.

The advantages of a small radial extent of the air gap become important in particular for a rotor winding which is constructed using conductors made of one of the known metal oxide HTS (high-$T_c$ superconducting) materials. Instead of this, conductors made of metallic LTS (low-$T_c$ superconducting) materials may of course also be employed. The conductor types which are usable may in this case be strip conductors or HTS stranded composite conductors, for example transposed conductors.

BRIEF DESCRIPTION OF THE DRAWINGS

These and other objects and advantages of the present invention will become more apparent and more readily appreciated from the following description of the preferred embodiments, taken in conjunction with the accompanying drawing which shows a longitudinal section through the machine in a schematized form.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The embodiment of the machine presented below with the aid of the FIGURE may, in particular, be a synchronous motor or a generator. The machine comprises a rotating superconducting exciter winding, which in principle allows use of metallic LTS material or oxidic HTS material. The latter material will be assumed for the exemplary embodiment. Measures for cooling the superconductor material, for example to a temperature of about 30 K, are widely known so that representation of these measures has been omitted from the FIGURE. The winding may be one coil or a system of coils in a two-, four- or other multi-pole arrangement. The basic structure of a corresponding synchronous motor is revealed by the FIGURE, known embodiments of corresponding machines being assumed (cf. U.S. Pat. No. 4,914,328 A cited in the introduction or WO 02/43224 A).

The machine denoted overall by 2 comprises a stationary outer housing which is at room temperature and has a fixed stator 3, end-side winding heads 3a of whose stator winding can be seen. Inside the outer housing and enclosed by the stator winding, so as to form an air gap 4 with a radial gap width w, there is a rotor 5 which is mounted so as to rotate about a rotor axis A. The rotor has a warm housing 6 which is generally at room temperature, and in which a vacuum V prevails for thermal insulation reasons in the manner of the cryostat. Inside the housing 6, which may thus be regarded as a vacuum housing or cryostat housing, a cold part 8 is held via suspension elements or other fastening elements 7a and 7b. The cold part (not referred to in further detail in the FIGURE) comprises in the manner known per se a winding former for receiving a superconducting exciter winding, which is to be cooled by a refrigerant. The refrigerant supply required for the exciter winding is not represented in the FIGURE, since it is widely known. The cold part 8 in this case has a cold outer side 8a jointly cooled directly or indirectly by the refrigerant of the winding. The FIGURE furthermore reveals that individual radially extending support elements 9a to 9d, for example in the form of individual spacers or spacer rings, are fitted at least in a central region of the cold part 8 on its outer side 8a. These support elements may concentrically enclose the outer side. The support elements do not extend as far as the inner side of the tubular housing wall 6a the vacuum housing 6; rather, a predetermined intermediate space or distance a is maintained between this wall 6a and the corresponding end side of each support element, so as to avoid or limit heat conduction losses via these elements during normal operation of the machine.

As is furthermore intended to be indicated by a bold line in the FIGURE, the housing wall 6a itself is formed in a manner known per se as a dampener shield (or part) 10, in which case the housing may for example be formed of steel. Alternatively a special dampener shield, for example made of copper (Cu) or aluminum (Al) or optionally an alloy of one of said materials, is fitted on the inner or outer side of the housing wall 6a. The dampener shield or the housing part acting as such may of course be composed of a plurality of parts (cf. U.S. Pat. No. 4,914,328 A cited in the introduction or EP 0 087 263 A2). The support elements 9a to 9d are then preferably arranged at positions of the cold part 8 where compressive forces, i.e. forces acting radially inward, act on this dampener shield 10 in the event of an anomalous situation, for example a short-circuit of the stator winding. According to the exemplary embodiment, it will be assumed that such compressive forces can act in a central region of the cold part 8, as seen axially. Depending on the geometry and materials selected for the dampener shield, for example Cu, a certain extent of radial deformation is assumed to be permissible without detrimental effects, for example 2 mm. The support elements should then be dimensioned so that they only come into play beyond a deformation by a particular extent, for example 1.5 mm. They therefore only have to absorb force components which would be needed in order to deform the dampener shield by more than this predetermined extent.

In order to limit the heat transfer via the support elements 9a to 9d in the event of mechanical contact with the warm housing 6 and the cold part 8, the support elements should preferably be formed of at least one material with poor thermal conductivity. Materials suitable for this, in particular, are glass fiber-reinforced plastic materials.

In order to be able to keep the thermal load due to radiation losses small during normal operation, i.e. when there is no such mechanical contact between the three said parts (i.e. the cold part 8, the support elements 9a to 9d and the housing 6), on the one hand the support elements 9a to 9d on the cold part 8 should be fitted below a required superinsulation 11, i.e. inside it. Optionally it is also possible that the surface of the component of the support elements, which surface under certain circumstances cannot lie below the superinsulation 11 for technical reasons and which faces the dampener shield, to be kept as small by suitable structuring, for example cross-sectional area reductions. Corresponding measures are advantageous in particular when superinsulation enclosing the cold part 8 is intended to be obviated. This is because in that case, the radiation losses without enclosing superinsulation may range up to about 500 W/m$^2$.

The FIGURE also shows a further superinsulation 12, which is fitted so that the support elements 9a to 9d partially extend through the superinsulation 12. If such superinsulation is intended to be provided on its own, then it is particularly advantageous to minimize the surface of the support elements which is exposed to the radiation from the dampener shield.

It should furthermore be taken into account that a circumferential support torus designed as an annular support element with a width of only 10 cm, for example as the element 9b, can already cause losses of about 50 W even with a cold part circumference of only 1 m. Often, corresponding refrigeration powers can scarcely be produced by cold heads of known machines at about 30 K. Furthermore, besides the high costs thereby entailed, this would require a compressor connection power of for example about 6 kW. For this reason, it is advantageous to arrange a plurality of columnar support elements 9a to 9d, for example 10 of them, each with a small cross section of for example 1 cm$^2$ on an area of for example 10×10 cm$^2$, instead of a scarcely more effective larger support with a cross-sectional area of 10 cm×10 cm=100 cm$^2$.

Either the support elements may be applied on the bandage after bandaging the rotor cold part 8; or they are fastened on the cold part before bandaging, so that they are then introduced into the bandage essentially in the manner of lamination.

According to the exemplary embodiment represented, it has been assumed that the support elements 9a to 9d are applied on the cold part 8 and the distance a is formed relative to the housing wall 6a or the dampener shield 10. The support elements may of course also be fastened in the warmth on the inner side of the dampener shield or the corresponding housing wall, so that the distance a relative to the cold part is then maintained. With respect to the idea of minimizing the radiation losses, here again similar ideas apply as in the embodiment of the machine represented in the FIGURE.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

What is claimed is:

1. A superconducting technology machine, comprising:
   a stator; and
   a rotor enclosed by the stator, the rotor being mounted so as to rotate about a rotor axis with an air gap between the stator and the rotor, the rotor comprising:
   a cold part containing superconductors of a rotor winding;
   a warm housing having an outer wall facing the air gap, the warm housing being thermally insulated from the cold part;
   a dampener shield provided on the outer wall of the warm housing; and
   support elements provided at predetermined positions between the warm housing and the cold part, the support elements extending in a radial direction between the warm housing and the cold part such that:
      there is a small distance respectively formed between the support elements and the warm housing in a normal operating condition of the machine in which the warm housing is deformed less than or equal to a predetermined amount, and
      there is a force-fit between the warm housing and the cold part via the support elements only in a stressed condition of the machine in which the warm housing is deformed greater than the predetermined amount.

2. The machine as claimed in claim 1, wherein the small distance is respectively formed between the support elements and the warm housing in the normal operating condition.

3. The machine as claimed in claim 1, wherein the support elements are arranged at those positions where a deformation force acting radially inwardly engages the warm housing with the cold part via the support elements in stressed condition.

4. The machine as claimed in claim 1, wherein the dampener shield is formed as part of the warm housing.

5. The machine as claimed in claim 1, wherein the dampener shield is arranged on the outside or inside of the warm housing.

6. The machine as claimed in claim 1, wherein the support elements are distributed in an axial direction.

7. The machine as claimed in claim 1, wherein the support elements are formed of a poorly thermally conducting material.

8. The machine as claimed in claim 7, wherein the support elements are formed of a glass fiber-reinforced material.

9. The machine as claimed in claim 1, wherein the rotor winding is constructed with conductors made of a low-$T_c$ superconducting material.

10. The machine as claimed in claim 1, wherein the rotor winding is constructed with conductors made of a high-$T_c$ superconducting material.

11. The machine as claimed in claim 2, wherein the support elements are arranged at those positions where a deformation force acting radially inwardly engages the warm housing with the cold part via the support elements in stressed condition.

12. The machine as claimed in claim 11, wherein the dampener shield is formed as part of the warm housing.

13. The machine as claimed in claim 12, wherein the dampener shield is arranged on the outside or inside of the warm housing.

14. The machine as claimed in claim 13, wherein the support elements are distributed in an axial direction.

15. The machine as claimed in claim 14, wherein the support elements are formed of a glass fiber-reinforced material.

16. The machine as claimed in claim 15, wherein the dampener shield is arranged on the outside or inside of the warm housing.

17. The machine as claimed in claim 16, wherein the support elements are distributed in an axial direction.

18. The machine as claimed in claim 17, wherein the support elements are formed of a glass fiber-reinforced material.

* * * * *